Aug. 22, 1967 — C. D. SPENCER — 3,337,662
PROCESS FOR CAVITY WETTING
Filed Oct. 10, 1963

INVENTOR.
CHARLES D. SPENCER
BY
AGENT

United States Patent Office 3,337,662
Patented Aug. 22, 1967

3,337,662
PROCESS FOR CAVITY WETTING
Charles D. Spencer, Whippany, N.J., assignor to Allied Chemical Corporation, New York, N.Y., a corporation of New York
Filed Oct. 10, 1963, Ser. No. 315,518
4 Claims. (Cl. 264—71)

This invention relates to a method for molding hollow objects, more particularly to an improved rotational casting process.

In the forming of materials by means of a revolving mold two principal processes, centrifugal molding and rotational molding are known. In the centrifugal process, the mold is charged with the material to be molded and the mold is then rotated about one or more axes at a relatively fast speed, whereby the material is deposited on and compacted against the interior surface of the mold cavity due to the centrifugal force. In the known rotational molding processes, on the other hand, the mold is rotated at low angular velocities at which the centrifugal force is below the combined effect of gravity and the viscosity of the material being molded so that a puddle of the material to be molded is constantly disposed at the lowest part of the mold and a layer of material is deposited on the walls of the mold cavity as they pass below the fluid or powder puddle. The deposition rate is a function of mold size, shape and temperature, as well as material temperature, viscosity, surface tension, contact time, adherence characteristics, etc. In establishing the criterion that the centrifugal force is to be lower than the combined effect of gravity and the viscosity of the material being molded as the condition of maintaining the puddle of material on the instantaneously lowest part of the mold, the effect of surface tension and like smaller effects are neglected. The expression is merely a qualitative statement of the requirement that the velocity of mold rotation is limited to values where centrifugal forces are still ineffective.

If the mold used in the rotational forming process is rotated about one axis, a single orbital ring of deposited material is formed on the walls of the mold cavity. The width of this orbital ring depends on the spreading tendency of the material as defined by its rheological properties and the attendant circumstances. Of course, if uniform coating of the entire interior mold surface is desired, as is the case in most applications, the rotation of the mold about a single axis leads to inadequate results. For this reason improved techniques have been suggested. According to one known method the mold is rotated about two axes, wherein the second axis is disposed orthogonally to the first axis, which is not vertical, and usually is rotated at a lower rate that the first axis. By this technique a plurality of orbital deposits, in the shape of "figure eights" of material are deposited on the interior surface of the mold, the paths of the deposits intersecting each other, and in most cases the spreading characteristics of the material and the changing direction of the gravitational effect enable it to flow along the mold surfaces, thereby establishing a continuous layer of material on the walls of the mold cavity between the original locations of the orbital deposits. It can be easily understood, however, that this technique imposes limitations upon the wall thickness uniformity of the object thus formed, especially when considering the widely varying physical properties of the various materials that can be used in the process.

Special problems are manifested when attempting to mold materials adapted to harden or polymerize during the molding rotation, for example, in situ anionically polymerized lactams, because of the relatively short time these materials remain liquids before their curing or polymerization is completed. The problems become even more emphasized when molded articles of substantially uniform wall thickness and of large or elongated shape are desired. Since some of these materials, such as the lactams, have a low viscosity in the monomer stage (in the case of lactams generally less than 10 centipoises), relatively high mold velocities may be accomplished by still maintaining the puddle at the lowest point of the mold. On the other hand a practical upper limit is imposed upon the mold velocity, because at higher spinning rates the material tends to build up in the extremities of non-spherical mold cavities and creates an undesired thickness of material in such locations. It is for this reason that even though the puddle can be maintained at the lower part of the mold, the centrifugal forces have to be limited to avoid such "corner build-up." Therefore, high mold speeds which would be desired to accomplish possibly greatest mold surface coverage within the possible shortest time are seriously limited.

Another drawback of the two-axis rotational molding method, especially in the case of materials adapted to harden or polymerize during the rotation, is that often the material of the puddle starts to set up before the entire deposition thereof on the walls of the mold cavity is completed. As the result of such lack of control over the process, rotationally molded items of such materials have more often than not a heavy spot of solidified material on a part of the interior of the hollow object.

In the two-axis rotational molding process, if the two axes rotate at an identical rate, still only one orbital deposit is accomplished on the walls of the mold cavity. If one axis is rotated faster than the other, the number of orbital deposits may be proportionately increased. The greater the speed ratio between the two axes, the greater is the area covered by the molding material. It has to be kept in mind, however, that by increasing the ratio between the speeds of the two axes the time, at a constant velocity as limited by the centrifugal force-depressing requirements, required for a complete revolution of the slower axis, i.e., the time of one complete mold-covering rotational cycle, increases proportionately with the speed ratio.

As another alternative, a technique has been used wherein the mold is rotated along a single horizontal or near-horizontal axis, while the rotation about the second axis, mentioned in the preceding process, is replaced by an oscillation of the mold in a direction orthogonal to the plane of rotation. The drawback of this technique is that the material buildup is uneven at the ends of the mold adjacent to the rotational axis.

It is the object of the invention to provide an improved rotational molding method, eliminating the drawbacks of prior art processes.

It is another object of the invention to provide a new rotational casting method providing a uniform wall thickness and highest possible surface area coverage within a short processing time.

Accordingly, in the process of the invention the mold, charged with the material to be molded, is rotated about two axes and is subjected to a reciprocating or oscillatory translational motion simultaneously with the rotation thereof; said reciprocating motion being at a frequency in cycles per minute at least twice the fastest rate of rotation in revolutions per minute of the mold about any axis.

Further features and advantages of my invention are given in the following detailed description, with reference being had to the accompanying drawing, wherein.

Figure 1:
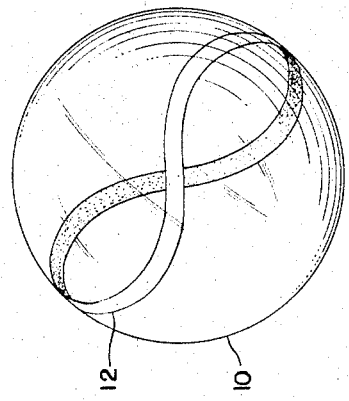
FIG. 1 shows a transparent spherical mold having material deposited therein according to a prior art two-axis rotational molding technique.

In FIG. 1 a transparent spherical mold 10 is shown in which from a puddle of molding material (not shown) a deposition pattern 12 was made whereby both axes were rotated at identical rates. As it can be seen, the width of the deposited pattern 12 is limited, and a substantial part of the interior surface of the mold is left uncoated after one revolution about both axes.

Figure 2:
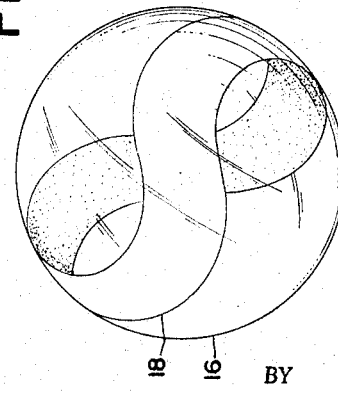
FIG. 2 shows a transparent spherical mold having material deposited therein according to the present invention.

In FIG. 2 a transparent spherical mold 16 is shown having a pattern 18 of material deposited therein by the process of the present invention. This is accomplished by means of rotating the mold 16 about two axes (not shown) disposed at an angle relative to each other, and simultaneously subjecting the mold to a reciprocatory oscillating influence. Due to the oscillations, the material forming the puddle moves about in the lower portion of the mold, thereby depositing a wider strip of material, such as the strip 18, compared to the narrower strip 12 of the prior art, thereby also covering a larger area of the mold 16 during a single revolution of the mold about the two axes. If time is of the essence, such as is the case of rapidly polymerizing, gelling or otherwise hardening materials, it is particularly advantageous that the substantially larger area coverage accomplished by the invention, as shown in FIG. 2, can be accomplished within the same time than the smaller area coverage shown in FIG. 1.

The uniformity of material deposition within one orbital deposit, according to the present process, will depend on the frequency of the reciprocating oscillating motion as a function of the rotational speed of the faster axis. If the mold is subjected only to a relatively few reciprocations during a complete revolution about the faster axis, the deposited ring will have a somewhat zigzagging or wave-like shape. By subjecting the mold to considerably more reciprocations during a single revolution of the faster axis the frequency of the wave-like deposited material is increased so as to have the individual waves formed by the individual reciprocations flow together and present a substantially uniformly deposited wide deposit of material. Besides possible apparatus limitations, the maximum frequency of mold oscillations is limited by the rheological properties of the material forming the puddle. Therefore, the expression "limiting frequency" refers to the maximum frequency of mold oscillations whereby a particular material can be sloshed back and forth at maximum amplitude without excessively forming turbidity-causing gaseous occlusions and without excessive turbulence of the puddle. The process of the invention can be employed on a practically unlimited variety of molding materials, such as plastomers, elastomers, vinyl and other plastisols, polyamides including all nylon varieties, natural or synthetic waxes, molding powders, chocolate and candy melts, metals, glass and other silicate melts, etc. As far as the characteristics of the materials are concerned, the molding technique of the invention can be used in connection with in situ polymerized materials, thermoplastics, thermosetting materials, both homo and co-polymers, with or without fillers.

Figure 3:
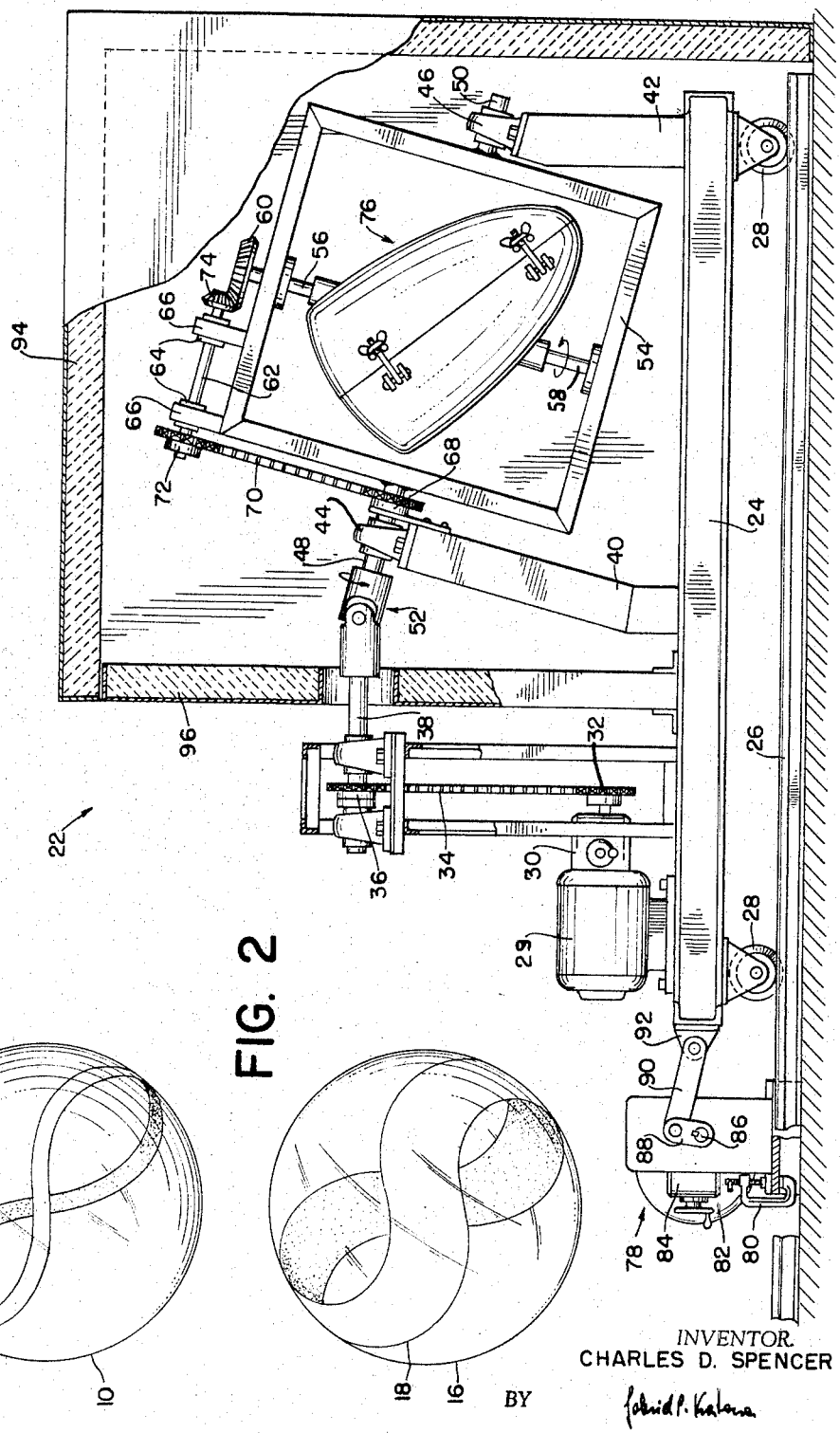
FIG. 3 shows an embodiment of the apparatus for carrying out the process of the invention.

A preferred embodiment of the apparatus suitable for carrying out the process of the invention is shown in FIG. 3. A mold rotating assembly 22 is mounted on a platform 24 adapted to move along a track 26 by means of wheels 28. The mold rotating assembly 22 is driven by a motor 29 acting through a variable speed drive 30 on a sprocket 32 connected by a drive chain 34 to a sprocket 36. The sprocket 36 is mounted for rotation with a drive shaft 38. Also mounted on the platform 24 are supports 40 and 42; bearings 44 and 46 are mounted at the upper extremities of the supports, respectively, and inclined at an angle of approx. 75° from the vertical. Primary axis members 48 and 50 are journaled in the bearings 44 and 46, respectively. One end of the primary axis member 48 is connected by a universal joint 52 to the opposing extremity of drive shaft 38. The inner extremities of the primary axis members 48 and 50 are welded to a rectangular frame member 54 made of angle iron or the like. Secondary axis members 56 and 58 are journaled in the sides of the frame 54 intermediate of the sides to which the primary axis members 48 and 50 are welded. The secondary axis member 58 is journaled in an axial bearing secured to the frame 54, while the secondary axis member 56 extends through the adjoining side of the frame 54 to the exterior thereof, and a bevel gear 60 is mounted on the outer end of the member 56 for rotation therewith. A secondary drive shaft 62 is mounted for rotation in bearings 64 mounted in bearing supports 66 attached to the adjacent side of the frame 54. A secondary drive sprocket 68 is firmly attached to the support 40, and floats on the primary axis member 48. The sprocket 68 is drivingly connected by a chain 70 to a sprocket 72 mounted on the outer end of the secondary drive shaft 62. A bevel gear 74 is mounted on the inner end of the secondary drive shaft 62, and meshes with the bevel gear 60. A mold 76 is attached to the opposing inner extremities of the secondary axes 56 and 58.

A reciprocating drive 78 is fastened to the track 26 by a clamp 80. The drive 78 includes a motor 82 connected to a variable speed drive 84 driving a shaft 86. A crank arm 88 is on one end thereof connected for rotation to the shaft 86. The other end of the crank arm 88 is connected to one end of a pitman 90. The other end of the pitman 90 is journaled to a lug 92 firmly attached to the platform 24.

The rotating assembly 22 is shown disposed in the interior of an oven 94, and an upstanding refractory wall portion 96 is supported on the platform to provide a closure for the oven when the rotating assembly is disposed therein.

In operating the apparatus of FIG. 3, a suitable charge of material to be molded (not shown) is introduced into the mold 76, subsequently the mold is closed and the platform or carriage 24 is pushed into the interior of the kiln 94. The motor 29 of the rotational drive and the motor 82 of the reciprocating drive are set in motion, whereupon the primary axis members 48 and 50 start to rotate driven by the primary drive shaft 38 through the universal joint 52. With the rotation of the primary axis 48 the sprocket 68 will set into motion the sprocket 72 through the chain 70, and the resulting rotation of the secondary drive shaft 62 and its bevel gear 74 meshing with the bevel gear 60 of the secondary axis rotates the secondary axis members 56 and 58 with the mold 76 fastened therebetween. The frame 54 describes a rotational path about the primary axis members 48 and 50, and simultaneously therewith the mold 76 also rotates about the secondary axis members 56 and 58 in a sense orthogonal to the plane of rotation of the frame. The drive shaft 86, as driven by the motor 82 through the variable speed drive 84, causes the crank arm 88 to describe a full rotation, while the pitman 90, eccentric to the shaft 86, reciprocates the carriage 24 on the track 26.

The speed ratio $N_p/N_s$ between the speed of the primary axis members 48 and 50 and the secondary axis members 56 and 58 is determined by the number of teeth on the sprockets 68 ($T_1$), 72 ($T_2$) and bevel gears 74 ($T_3$), 60 ($T_4$):

$$\frac{N_p}{N_s} = \frac{T_2 T_4}{T_1 T_3}$$

If the number of teeth on the sprockets 68 and 72 is identical ($T_1 = T_2$), then the ratio of the number on teeth on the bevel gear 60 and the number of teeth on the bevel gear 74 will alone determine the speed ratio between the primary and secondary axes. The optimum speed ratio between the primary and secondary axes, the rotational speed setting by means of the variable rotating drive 30, and the reciprocating frequency setting by means of the variable speed drive 84 have all to be determined with regard to the shape and size of the object to be molded, as well as by the physical properties of the material to be molded.

As indicated, the process of the present invention has materially contributed to the improved molding of in situ anionically polymerized lactams, which tend to solidify by polymerization within a relatively short time. In the case of materials like these the time during which the rotational molding and complete mold surface coverage has to be accomplished is limited, at the same time the rotational velocity is limited by the need to keep the centrifugal forces low to avoid corner "build-up." The reciprocating motion assures larger area coverage within the same time, and it being a translational motion, the velocity added thereby to the puddle of material does not increase the centrifugal forces, thereby assuring larger area coverage without material build-up in the extremities of the mold. In the following, an example of an embodiment of the process is disclosed as applied to in situ anionic polymerization of lactams having generally low viscosities around 10 centipoises in the monomer state, however, it is to be understood that the process of the invention is also applicable in the case of other materials, as indicated in the preceding, such as plastisols having viscosities in excess of 2,500 centipoises, fluid thermoplastics having a viscosity in the neighborhood of 200 poises, or liquids or melts of even higher viscosities. The minor adjustments of the processing parameters for any given material may be determined by routine experimentation.

Example

A rectangular tank having a capacity of 0.91 gallon was rotationally molded in a metal mold consisting of two symmetrical left and right halves. The mold cavity was 10.6 inches long, 5.7 inches deep and 4.9 inches wide with the parting line plane halfway across the width. At the top and bottom of the cavity at the parting line, 3.75 inches from one end were a 1.75 inch diameter threaded male filler connection and a ¼ NPT male fuel line connection, respectively. Running around the width and depth of the tank exterior were four rings each ⅛ inch wide, ¹⁄₁₆ inch high, and spaced 2.25 inches apart.

The mold was thoroughly cleaned, clamped and secured into the rotational device of FIG. 3. Subsequently, the mold was preheated in a kiln until the air temperature-measuring thermocouple indicated 154° C. The thermocouple was placed through a ⅝ inch fitting hole located adjacent to the parting line at the tank filler connection. Just prior to filling the mold, it was purged for four seconds with a high velocity blast of dry nitrogen directed into the resin filler hole. A prepolymer mixture consisting of caprolactam, a polymerization catalyst and a promoter or co-catalyst was charged into the mold at 100° C. Materials of this type are described in greater detail, for instance, in Belgian Patent No. 623,840. The filling hole was quickly plugged and mold rotation was started immediately. The primary axis was rotated at a speed of 11 r.p.m. and the secondary axis at ⅓ of this speed. Subsequently the mold carriage was rolled into the kiln.

The reciprocating drive was set to provide a translational oscillation having an amplitude of 2⅜ inches at 45 cycles per minute. After 25 minutes the carriage was withdrawn from the oven, the mold was opened. The formed tank had a wall thickness uniformity considerably better than could be accomplished heretofore without the reciprocating motion.

It is to be understood that the invention is disclosed by way of a preferred embodiment thereof. Depending on production requirements and material characteristic a number of modifications may be employed. Different materials and different production rates would require different processing temperatures and durations, while some materials, such as thermoplastic resins may also require cooling during the process. Production requirements may warrant the use of continuous tunnel kilns rather than batch-loading furnaces, while in certain applications the use of a furnace could be substituted with localized heating of the mold. Similarly, a great variety of speed ratios between the primary and secondary axes as well as reciprocating frequencies may be employed. Vibration may also be employed to reduce the viscosity of viscous, thixotropic materials to be molded, but the reciprocation of the mold and the limiting frequency of the reciprocations used according to the invention are not to be confused with the small amplitude vibrations employed to change the rheological properties of such materials. In view of the foregoing, the scope of the invention is to be interpreted from the appended claims.

I claim:
1. A rotational molding process, comprising the steps of charging a mold cavity with a material to be molded, rotating the mold about a pair of axes angularly disposed with respect to each other at rates of rotation at which the resulting centrifugal forces are lower than the combined effect of gravity and viscosity of the material to be molded for continuously washing the walls of the mold cavity with said material to build up a thickness of material conforming to the shape of the walls of the mold cavity, reciprocating said mold in translational motion simultaneously with the rotation thereof at a frequency in cycles per minute of at least twice the fastest rate of rotation in revolutions per minute of the mold about any axis, such that the wavelike deposits formed by the individual reciprocations flow together, thereby increasing the area of the walls of the mold cavity contacted within a given time by the material to be molded.

2. The process of claim 1, wherein the frequency of reciprocations does not exceed the limiting frequency of the material to be molded.

3. The process of molding a hollow article, comprising the steps of charging a mold cavity with a monomer mix including caprolactam, an anionic catalyst and a polymerization promoter, rotating said mold about a primary axis and a secondary axis disposed at an angle with regard to said primary axis, the primary axis being rotated at a higher r.p.m. than said secondary axis, said rotation being conducted at a rate at which the resulting centrifugal forces are lower than the combined effect of gravity and the viscosity of the monomer mix for continuous washing of the walls of the mold cavity with said monomer mix to build up a thickness thereof on the said walls, reciprocating said mold in translational motion simultaneously with the rotation thereof at least twice during each revolution of the primary axis for increasing the area of the walls of the mold cavity contacted within a given time by the monomer mix, maintaining the temperature of the monomer mix between 100° and 215° C. simultaneously with the reciprocation and rotation of the mold whereby the monomer mix polymerizes into a solid article of polycaprolactam conforming to the shape of the walls of the mold cavity, and removing the polymerized article from the mold.

4. The process of claim 3 wherein said primary axis rotates at least four times faster than said secondary axis.

References Cited
UNITED STATES PATENTS

| | | | |
|---|---|---|---|
| 1,812,242 | 6/1931 | Jensen. | |
| 2,629,130 | 2/1953 | Rempel | 264—311 X |
| 3,072,965 | 1/1963 | Miller | 264—310 X |
| 3,164,654 | 1/1965 | Spencer | 264—311 |
| 3,217,078 | 11/1965 | Kleiber | 264—310 |

ROBERT F. WHITE, *Primary Examiner.*

S. I. LANDSMAN, *Assistant Examiner.*